US012381046B2

(12) United States Patent
Marchal et al.

(10) Patent No.: US 12,381,046 B2
(45) Date of Patent: Aug. 5, 2025

(54) POWER SHUT-OFF MODULE WITH DIELECTRIC BARRIER

(71) Applicant: SOCOMEC, Benfeld (FR)

(72) Inventors: Arnaud Marchal, Ebersmunster (FR); Damien Rogosinski, Selestat (FR)

(73) Assignee: SOCOMEC, Benfeld (FR)

( * ) Notice: Subject to any disclaimer, the term of this patent is extended or adjusted under 35 U.S.C. 154(b) by 0 days.

(21) Appl. No.: 18/871,636

(22) PCT Filed: Jun. 20, 2023

(86) PCT No.: PCT/EP2023/066680
§ 371 (c)(1),
(2) Date: Dec. 4, 2024

(87) PCT Pub. No.: WO2024/022681
PCT Pub. Date: Feb. 1, 2024

(65) Prior Publication Data

US 2025/0174417 A1 May 29, 2025

(30) Foreign Application Priority Data

Jul. 26, 2022 (FR) ....................................... 2207641

(51) Int. Cl.
*H01H 9/32* (2006.01)

(52) U.S. Cl.
CPC .................................... *H01H 9/32* (2013.01)

(58) Field of Classification Search
CPC .... H01H 1/365; H01H 1/42; H01H 2001/425; H01H 2001/2033; H01H 2001/2025; H01H 9/32; H01H 9/34; H01H 2009/305
USPC ........................... 200/304, 305, 50.08, 50.22
See application file for complete search history.

(56) References Cited

U.S. PATENT DOCUMENTS

| | | | | | |
|---|---|---|---|---|---|
| 2,007,911 | A | | 7/1935 | Von Normann | |
| 4,647,741 | A | * | 3/1987 | Belbel | H01H 9/32 218/117 |
| 4,801,772 | A | * | 1/1989 | Bratkowski | H01H 77/10 218/117 |
| 4,849,591 | A | * | 7/1989 | Comtois | H01H 9/32 218/117 |

(Continued)

FOREIGN PATENT DOCUMENTS

| | | | |
|---|---|---|---|
| CN | 104106121 | A | 10/2014 |
| CN | 210349622 | U | 4/2020 |

(Continued)

*Primary Examiner* — William A Bolton
(74) *Attorney, Agent, or Firm* — Forge IP, PLLC

(57) ABSTRACT

A power shut-off module includes an insulating housing, two pairs of fixed contacts and two movable contacts rigidly attached to an item of movable equipment that is movable in translation in the housing between an open position and a closed position. The module includes an insulating shield device having a fixed end rigidly attached to the housing and a movable end rigidly attached to the item of movable equipment, and which has a length that is variable between an extended position when the item of movable equipment is in the open position and a retracted position when the item of movable equipment is in the closed position, in order to create a dielectric barrier between the fixed contacts of one and the same pair of fixed contacts.

8 Claims, 7 Drawing Sheets

(56) References Cited

U.S. PATENT DOCUMENTS

| | | | | |
|---|---|---|---|---|
| 6,084,193 | A * | 7/2000 | Pellon | H01H 9/32 218/117 |
| 8,686,311 | B2 * | 4/2014 | Vigouroux | H01H 9/32 218/147 |
| 9,429,312 | B2 * | 8/2016 | Beaver | H01H 9/161 |
| 10,199,185 | B2 | 2/2019 | Carrea | |
| 10,770,248 | B2 * | 9/2020 | Oh | H01H 1/2058 |
| 2014/0048513 | A1 * | 2/2014 | Sato | H01H 73/18 218/117 |
| 2016/0211087 | A1 * | 7/2016 | Minke | H01H 50/546 |
| 2020/0098531 | A1 * | 3/2020 | Zhang | H01H 73/18 |

FOREIGN PATENT DOCUMENTS

| | | | |
|---|---|---|---|
| CN | 111489920 | A | 8/2020 |
| CN | 113841302 | A | 12/2021 |
| CN | 114446677 | A | 5/2022 |
| EP | 0270389 | A1 | 6/1988 |
| EP | 3166123 | A1 | 5/2017 |
| FR | 2694444 | A1 | 2/1994 |

* cited by examiner

POWER SHUT-OFF MODULE WITH DIELECTRIC BARRIER

TECHNICAL FIELD

The present invention relates to an electrical shut-off module comprising an electrically insulating housing, at least one pair of fixed contacts, including an upstream fixed contact and a downstream fixed contact, and at least one movable contact secured to an item of equipment which is movable in translation in said housing with respect to said at least one pair of fixed contacts between an open position and a closed position.

PRIOR ART

The present invention applies to current shut-off apparatus in which the opening of the electrical contacts is accomplished by a linear translational movement of movable contacts with respect to fixed contacts. In such shut-off modules, the electrical characteristics of the shut-off apparatus are determined in part by the air volume in the shut-off chambers and the control of the dielectric separation between the fixed electrical current input contacts and the fixed electrical current output contacts. These electrical characteristics correspond to the ability of the shut-off apparatus to manage the electric arc which is generally generated when the electrical circuit is opened and to rapidly extinguish it. The shut-off chambers are delimited by the interior walls of the housing and comprise the fixed and movable contacts between which the electric arc is likely to be generated.

Linear shut-off modules generally comprise a movable bar, which bears the movable contacts, and which is smaller in length than the useful length of the shut-off housings, in order to enable it to travel its path between an open position and a closed position and vice versa, without colliding with the housing.

FIG. 1 illustrates an example of a shut-off module 1 of the prior art, comprising an electrically insulating housing 2, of which only the lower half-housing 20 is shown, two pairs of fixed contacts 3, and two movable contacts 4 borne on an item of movable equipment, generally known as a bar 5 which is movable in translation in the direction of the arrow T. FIG. 1 illustrates the shut-off module 1 in the open position, in which the movable contacts 4 are remote from the fixed contacts 3 and the electrical circuit is open. The end 5*a* of the movable bar 5 located on the right in FIG. 1 is close to or against the corresponding transverse wall 22 of the housing, occupying the air volume of the shut-off chamber CC and naturally forming a dielectric separation or dielectric barrier between the upstream fixed contact 3*a* and the downstream fixed contact 3*b* of the pair located on the right. In contrast, the end 5*b* of the movable bar 5 located on the left of FIG. 1 is remote from the corresponding transverse wall 23 of the housing, freeing the air volume of the shut-off chamber CC, and exposing the upstream fixed contact 3*a* and the downstream fixed contact 3*b* of the pair located on the left to possible channelling of the electric arc E between them, as can be seen in FIG. 2. In this left hand portion of the housing 2, the dielectric separation or dielectric barrier between the upstream fixed contact 3*a* and the downstream fixed contact 3*b* is therefore breached when the movable bar 5 is in the open position, which limits the electrical performance of the shut-off apparatus and gives rise to an electrical risk for personnel and downstream equipment.

Publication EP 270 389 A1 describes a multipole rotary switch the rotatably movable bar of which comprises a metal grounding shield, and which is said to provide a disconnection function in order to maintain the isolation between the input and output terminals of the switch. However, this solution is limited to a rotary shut-off module, and is unsuitable for a linear shut-off module.

Publications US 2 007 911 A and FR 2 694 444 A1 describe linear shut-off modules equipped with an electrically insulating shield device, the performance of which depends on the position of the movable bar.

DISCLOSURE OF THE INVENTION

The present invention aims to overcome these disadvantages by proposing a deformable dielectric barrier between the movable bar and the housing of the shut-off module in a manner such as to maintain the dielectric qualities necessary for achieving the intended electrical performance of said module, irrespectively of the position of the movable bar.

To this end, the invention concerns a shut-off module of the type indicated in the preamble, characterized in that it comprises an electrically insulating shield device disposed in said housing between the upstream fixed contact and the downstream fixed contact of said at least one pair of fixed contacts, said shield device comprising a fixed end secured to said housing and a movable end secured to said movable equipment and having a length which can be varied between an extended position when said movable equipment is in the open position and a retracted position when said movable equipment is in the closed position in order to produce a dielectric barrier between the upstream fixed contact and the downstream fixed contact of said at least one pair of fixed contacts.

In a first embodiment, said shield device may be of telescopic construction. In this case, it may comprise at least two segments, including a fixed segment secured to said housing and a movable segment secured to said movable equipment. It may also further comprise at least one intermediate segment which slides with respect to the fixed segment and to the movable segment.

In this embodiment, said shield device advantageously comprises translational abutments disposed in order to define said extended position, and respectively provided between the different segments.

Preferably, said shield device and said housing have respective complementary guide forms disposed to guide said movable segment and/or said intermediate segment in sliding translation with respect to said housing.

In a second embodiment, said shield device may be capable of being wound and comprise at least one membrane wound around a rotational axle secured to the housing, the membrane comprising a fixed end secured to the housing and a movable end secured to the movable equipment.

In a third embodiment, said shield device may be extensible and comprise at least one pleated membrane, the membrane comprising a fixed end secured to the housing and a movable end secured to the movable equipment.

BRIEF DESCRIPTION OF THE DRAWINGS

The present invention and its advantages will become more apparent from the following description of several embodiments given by way of non-limiting example, made with reference to the accompanying drawings, in which.

DESCRIPTION OF THE EMBODIMENTS

Figure 1:
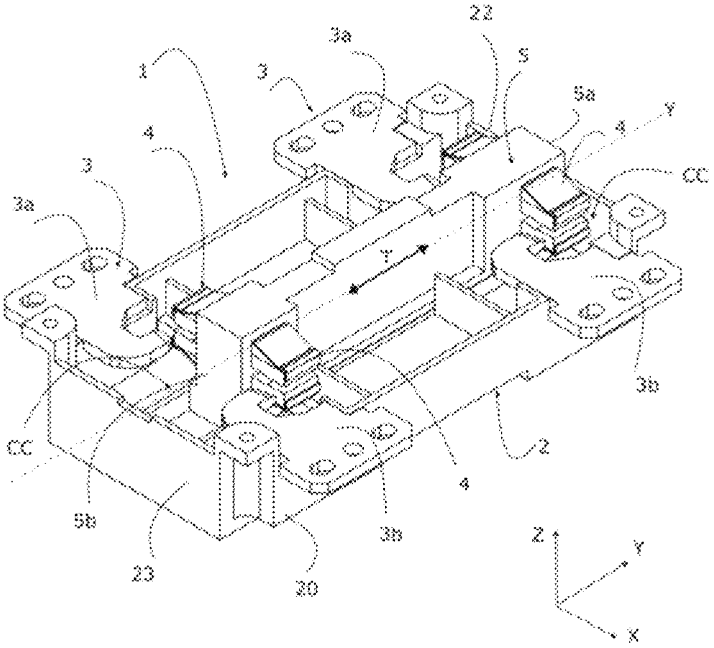
Fig. 1 PRIOR ART
FIG. 1 is a perspective view of a shut-off module in accordance with the prior art, in the open position, without the upper portion of the housing.

In the exemplary embodiments shown, identical elements or portions carry the same reference numbers. Furthermore, terms which have a relative meaning, such as vertical, horizontal, right, left, front, back, above, below, etc., must be interpreted under the normal conditions of use of the invention, and as shown in the figures. The axes X, Y and Z are themselves defined by an orthonormal reference system, shown in FIG. 1. Furthermore, the geometrical positions indicated in the description and the claims, such as “perpendicular”, “parallel”, “symmetrical”, are not limited in the strict geometrically defined sense, but encompass geometrical positions which are close, i.e. within a certain tolerance which is acceptable in the technical field in question, without affecting the result obtained. This tolerance is, in particular, introduced by the adverb “substantially”, without this term necessarily being repeated in front of each adjective.

With reference to FIGS. 3 to 14, the electrical shut-off module 10 in accordance with the invention comprises an electrically insulating housing 2 constituted by two half-housings: a lower half-housing 20 and an upper half-housing 21, assembled and secured by any known means, such as screw fastening members (not shown). The shut-off module 10 comprises at least one pair of fixed contacts 3 and two pairs of fixed contacts 3 in the example which is shown, each pair comprising an upstream fixed contact 3*a* and a downstream fixed contact 3*b* if the current flows from top to bottom in the figures. Each fixed contact 3 is conventionally constituted by a strip 30 produced from electrically conductive material and comprises a connection pad 31 outside the housing 2 provided with holes 32 for fixing a power cable (not shown). The shut-off module 2 comprises at least one movable contact 4 and, in the example shown, two movable contacts 4 borne by and secured to a movable item of equipment 5, generally known as a movable bar. Each movable contact 4 is conventionally constituted by two strips 40 produced from electrically conductive material, superposed and secured to each other by a spring member 41 in order to form a clamp which is capable of fitting onto the corresponding strip 30 of the fixed contacts 3. This type of docking is known as a sliding contact; however, this example is not limiting.

The movable equipment 5 carrying the movable contacts 4 is mounted in the housing 2 so as to be movable in translation in the direction of the arrow T with respect to the pairs of fixed contacts 3 between an open position (FIG. 3), in which the electrical contacts are open and the electrical circuit is interrupted, and a closed position (FIG. 4), in which the electrical contacts are closed and the electrical circuit is made. To this end, the housing 2 and the movable equipment 5 comprise complementary fitting shapes ensuring a guiding function in translation along the longitudinal axis Y of the housing; examples are grooves and ribs. They may also comprise end-of-travel abutments in order to define the extreme positions of the movable equipment 5, corresponding to the open position (FIG. 3) and to the closed position (FIG. 4); examples are shoulders with complementary shapes.

Each pair of fixed contacts 3 and its corresponding movable contact 4 defines between them a shut-off zone in which an electric arc is likely to extend, in particular when the electrical circuit is opened. The shut-off module 10 therefore comprises at least one shut-off chamber and, in the example shown, two shut-off chambers CC, delimited by the interior walls of the housing 2 and each comprising a shut-off zone for managing the electric arc with a view to cutting off the current.

The shut-off chamber CC located on the right of the figures comprises the movable equipment 5 when it is in the open position. It therefore occupies the air volume of this shut-off chamber CC, isolating the upstream fixed contact 3*a* from the downstream fixed contact 3*b*, forming a dielectric barrier, and promoting the extinction of the electric arc and cutting off the current.

Figure 2:
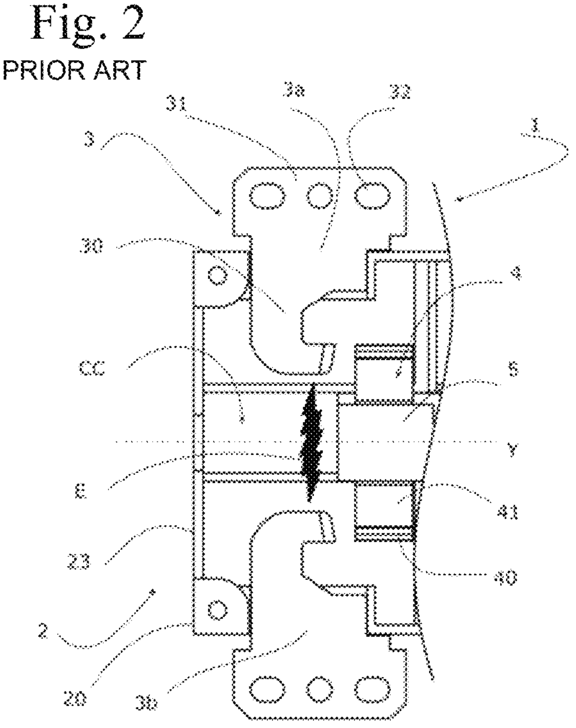
Fig. 2 PRIOR ART
FIG. 2 is a top view of the shut-off module of FIG. 1.

In accordance with the invention, the shut-off chamber CC located on the left of the figures comprises an electrically insulating shield device 50, added to the housing 2 between the upstream fixed contact 3*a* and the downstream fixed contact 3*b* in order to fulfil these same functions, namely to occupy the air volume of this shut-off chamber CC, to isolate the upstream fixed contact 3*a* from the downstream fixed contact 3*b*, to form a dielectric barrier, and to promote the extinction of the electric arc and to cut off the current. It will be recalled that without this shield device 50, in accordance with FIGS. 1 and 2, the electric arc E which forms respectively between the upstream fixed contact 3*a* and the movable contact 4, then between the movable contact 4 and the downstream fixed contact 3*b*, in particular when the electrical circuit is opened, risks being displaced and being established directly between the upstream fixed contact 3*a* and the downstream fixed contact 3*b*, maintaining a flow of current while the shut-off module 1 is in the open position, giving rise to a dangerous situation for personnel and downstream equipment.

In the example illustrated in FIGS. 3 to 10, the shield device 50 is telescopic in construction and comprises at least two segments and, in this example, three segments 51, 52, 53, without this number of segments being limiting, disposed to slide with respect to one another and to adapt the length of the shield device 50 to the length of the shut-off chamber CC as a function of the displacement of the movable equipment 5 between the two extreme positions. Thus, the shield device 50 is designed to have a variable length between two end positions, namely an extended position when the movable equipment 5 is in the open position, and a retracted position when the movable equipment 5 is in the closed position, in a manner such that it fulfils its dielectric barrier functions irrespectively of the position of the movable equipment 5.

The shield device 50 has a three-dimensional polyhedral-type shape (see FIGS. 5 and 6 in particular) in order to match the shapes of the interior walls of the housing 2 and occupy the major portion of the volume of the shut-off chamber CC. In addition, these three-dimensional shapes are complementary to those of the housing 2 and ensure a guiding function in translation along the longitudinal axis Y of the housing 2; examples are grooves and ribs.

In this example, the shield device 50 comprises:

- a fixed segment 51 secured to the housing 2,
- a movable segment 53 secured to the movable equipment 5, and
- an intermediate segment 52 sliding freely on the fixed segment 51 and in the movable segment 53, the section of the fixed segment 51 being inscribed in the section of the intermediate segment 52, and the section of the intermediate segment 52 being inscribed in the section of the movable segment 53. In this configuration, the fixed segment 51 is the smallest and housed in the interior, while the movable segment 53 is the largest and is disposed on the exterior of the shield device 50. This example is not limiting since an inverse configuration may also be suitable, i.e. the movable segment is the smallest and housed in the interior while the fixed segment is the largest and disposed on the exterior of the shield device (see FIGS. 11 and 12). In this example of a telescopically constructed shield device 50, the length of the segments 51, 52, 53 in the extended position must cover the total length of the shut-off chamber CC when the movable equipment 5 is in the open position, without discontinuities. In addition, the length of these segments 51, 52, 53 must allow them to recover into the retracted position in the remaining volume of the shut-off chamber CC when the movable equipment 5 is in the closed position.

The fixed segment 51 is constituted by a hollow part comprising a front wall 54 and a peripheral wall 55 which extends perpendicularly from the front wall 54 in the direction of the movable equipment 5 and in the longitudinal axis Y of the housing. The front wall 54 adjoins the corresponding transverse wall 23 of the housing. It is provided with a fixing lug 56 which will fit into a corresponding notch 57 provided in the housing 2 in order to maintain this first segment in a fixed position and produce the fixed point of the shield device 50. The fixing lug 56 may or may not extend inside the fixed segment 51, so as to serve or not serve as a reinforcement. The peripheral wall 55 has a polygonal section, constituted by a plurality of facets at right angles to one another, in order to form U-shaped outer ribs, including at least two lateral ribs 58, a lower rib 59 and an upper rib 60, respectively connected together by L-shaped shoulders 61. All or part of the free edge of the peripheral wall 55 comprises a translational abutment 62, disposed to cooperate with a complementary translational abutment provided on the intermediate segment 52. The translational abutment 62 may be formed by a continuous or discontinuous rim, folded outwards, for example at a right angle. Any other equivalent means may be suitable.

The intermediate segment 52 is constituted by an annular part comprising a peripheral wall 63 which extends along the longitudinal axis Y of the housing. The peripheral wall 63 has a polygonal section which is complementary to that of the fixed segment 51, constituted by a plurality of sections at right angles to one another, in order to produce lateral 64, lower 65 and upper 66 grooves on the one hand and U-shaped lateral 67, lower 68 and upper 69 ribs on the other hand, respectively connected to one another by L-shaped shoulders 70. The lateral 64, lower 65 and upper 66 grooves are disposed to slide axially on the lateral 58, lower 59 and upper 60 ribs of the fixed segment 51 with an operating clearance. All or part of the free edge of the peripheral wall 63 on the side of the fixed segment 51 comprises a translational abutment 71 in order to cooperate with the translational abutment 62 of the fixed segment 51, constituted by a continuous or discontinuous inwardly folded rim and defining the extended position of the intermediate segment 52. The lower 68 and upper 69 ribs are disposed to slide axially in the lower 24 and upper 25 grooves of the housing 2 with an operating clearance. All or part of the free edge of the peripheral wall 63 on the side of the movable segment 53 comprises a translational abutment 72 in order to cooperate with a complementary translational abutment provided on the movable segment 53.

The movable segment 53 is constituted by two half-parts, each comprising a three-dimensional side wall 73, one portion of which (on the left in the figures) being solid and having interfitting shapes complementary to those of the corresponding face of the intermediate segment 52, and the other part (on the right in the figures) being perforated and comprising two superposed windows 74 separated by a fixing bar 75. Thus, each side wall 73 of the movable segment fits laterally onto the movable equipment 5 to be fastened thereto by a screw 76 or any other equivalent fastener, removable or not. To this end, the perforated portion of each side wall 73 fits over the strips 40 of the movable contact 4 which pass through the superposed windows 74, and the solid portion of each side wall 73 is cantilevered at the left hand end 5*a* of the movable equipment 5 in the direction of the intermediate segment 52. Each side wall 73 of the movable segment 53 comprises an inner groove 77 disposed to slide on the corresponding lateral rib 67 of the intermediate segment 52 by means of an operating clearance, and an outer groove 78 to open up an axial passage for the strip 30 of the corresponding fixed contact 3 during the displacement of the movable equipment 5. Part or all of the free edge of the side walls 73 of the movable segment 53 comprises a translational abutment 79 constituted by a continuous or discontinuous inwardly folded rim in order to cooperate with the translational abutment 72 of the intermediate segment 52, defining the extended position of the intermediate segment 52 and therefore of the entirety of the shield device 50.

Furthermore, the combination of the U-shaped guide ribs and grooves and the L-shaped shoulders provided respectively on the segments 51, 52, 53 of the shield device 50 also ensure centring of the segments with respect to each other and with respect to the housing 2.

Figure 3:
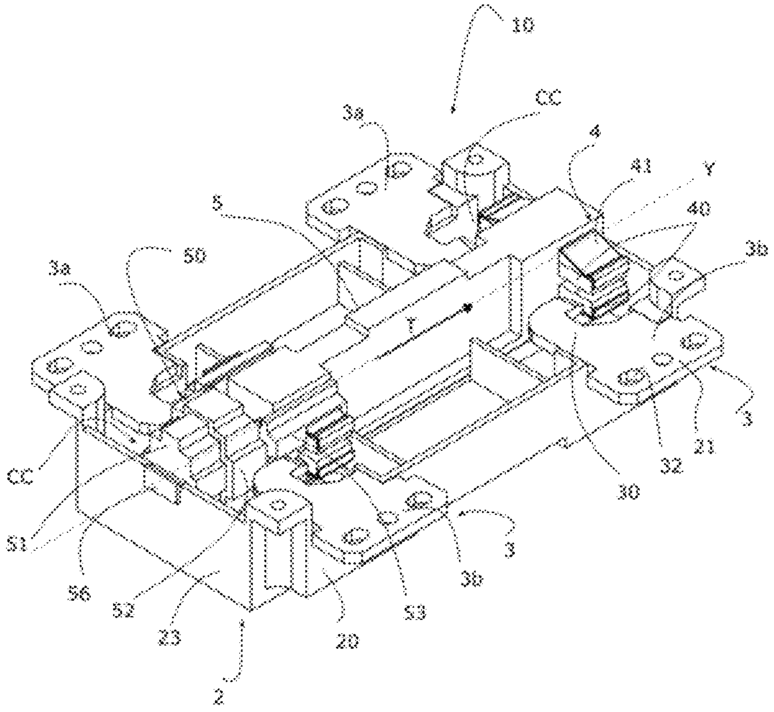
FIG. 3 is a perspective view similar to that of FIG. 1, showing a shut-off module in accordance with the invention, in the open position, equipped with a shield device in the extended position.
Figure 4:
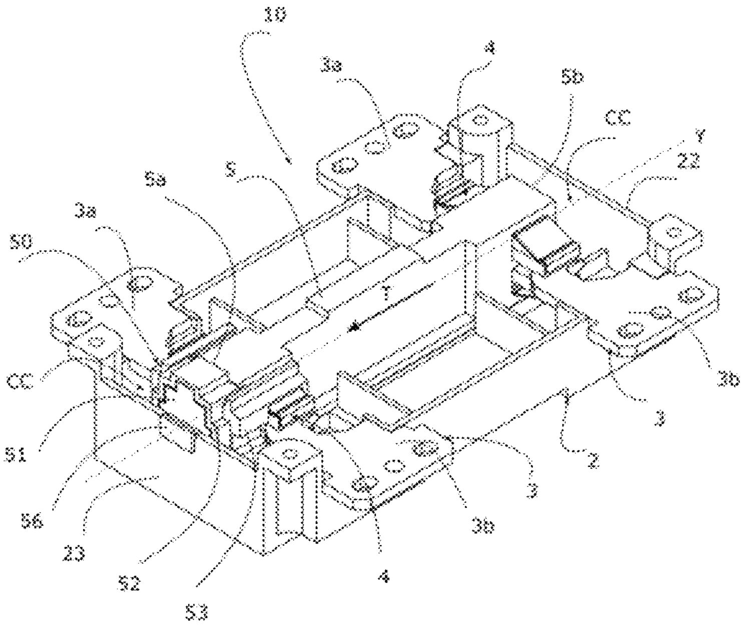
FIG. 4 is a view similar to that of FIG. 3, showing the shut-off module in the closed position and the shield device in the retracted position.
Figure 5:
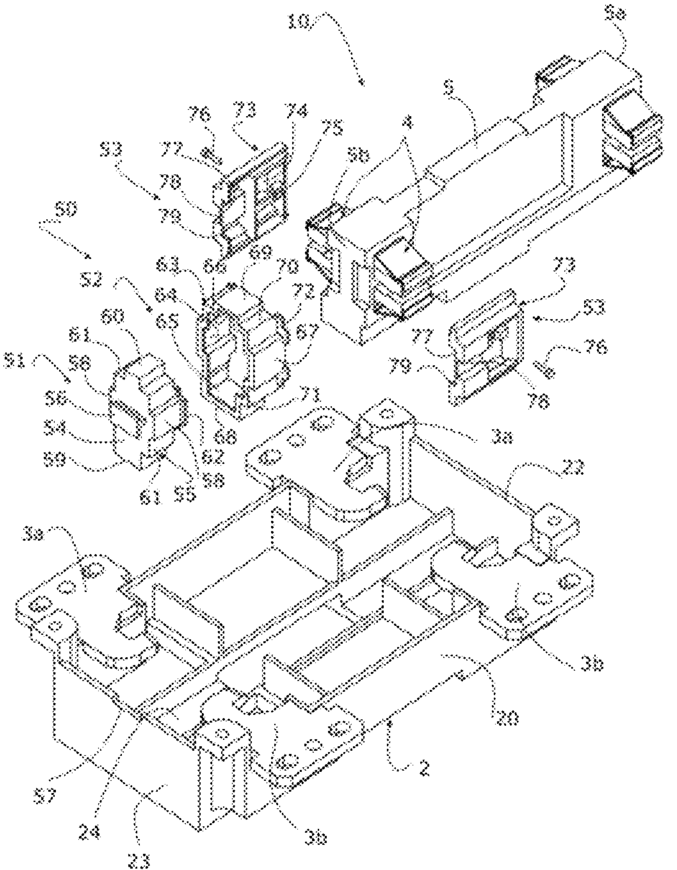
FIG. 5 is an exploded view of the shut-off module of FIG. 3.
Figure 6:
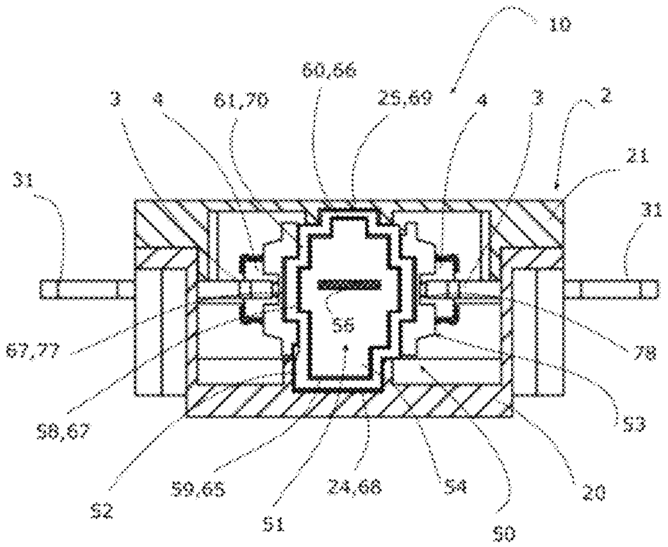
FIG. 6 is a cross sectional view of the shut-off module of FIG. 3.
Figure 7:
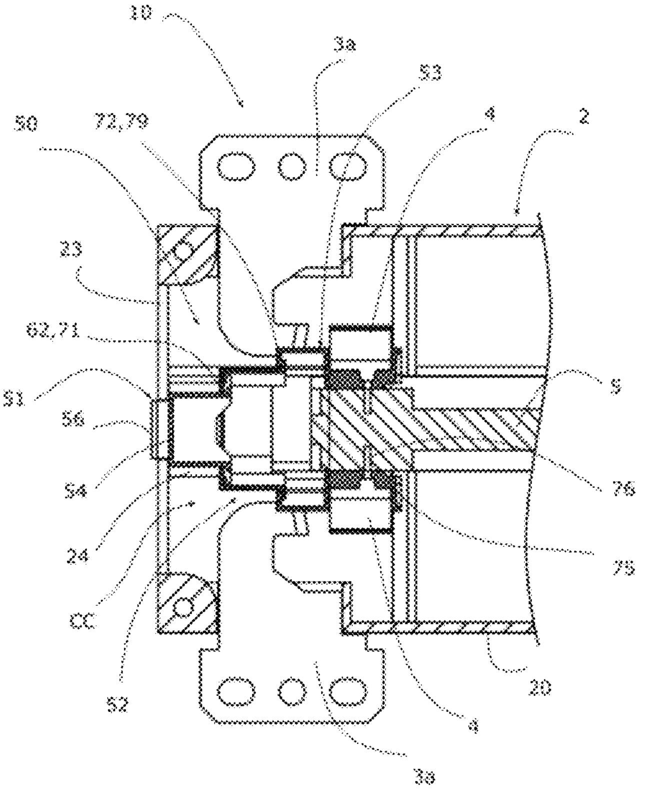
FIG. 7 is a sectional view along the horizontal sectional plane VII-VII of the left hand portion of the shut-off module of FIG. 3, in the open position.
Figure 8:
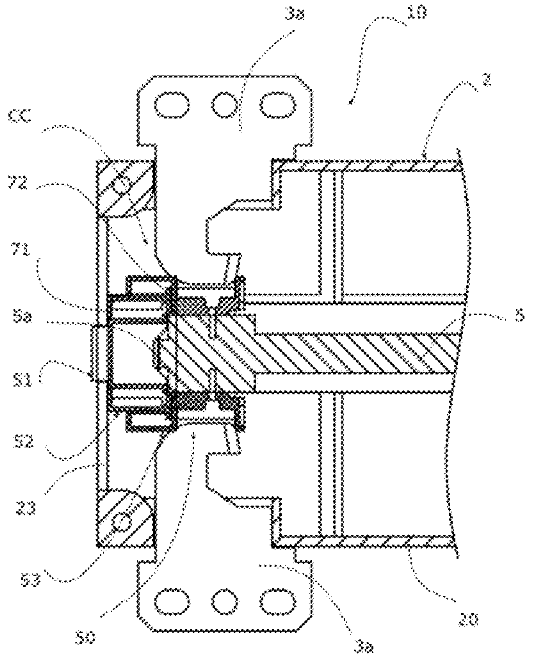
FIG. 8 is a view similar to that of FIG. 7 along the sectional plane VIII-VIII of the left hand portion of the shut-off module of FIG. 4, in the closed position.
Figure 9:
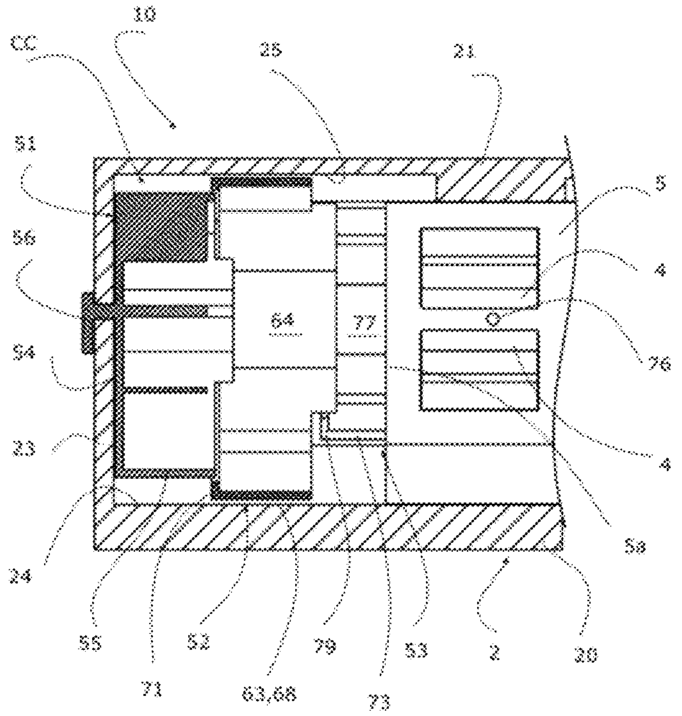
FIG. 9 is a sectional view along the vertical sectional plane IX-IX of the left hand portion of the shut-off module of FIG. 3, in the open position.
Figure 10:
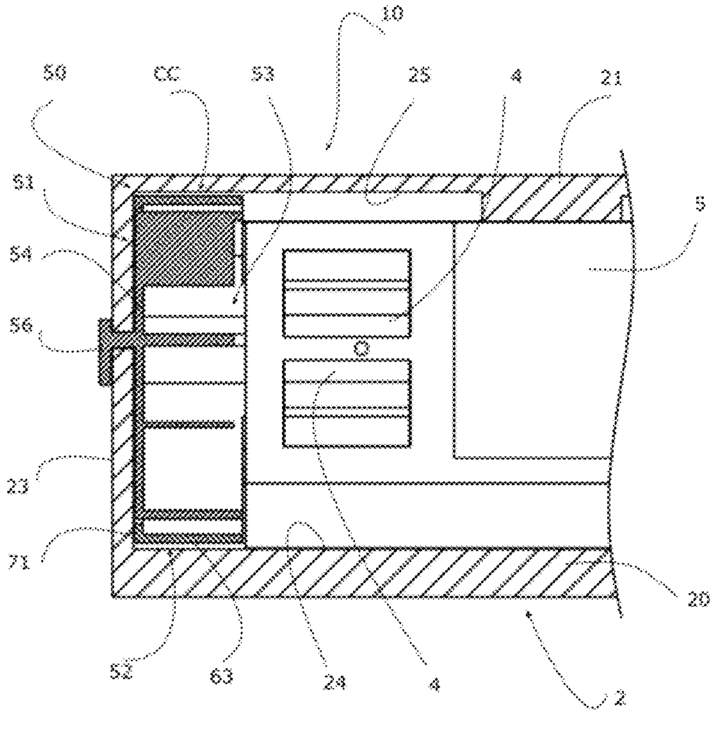
FIG. 10 is a view similar to that of FIG. 9 along the sectional plane X-X of the left hand portion of the shut-off module of FIG. 4, in the closed position.

The operation of the shield device 50 is simple and automatic. When the movable equipment 5 is in the open position, the shield device 50 is in the extended position, as shown in FIGS. 3, 7, 9: the axial position of the segments 51,

52, 53 with respect to one another is defined by the contact between the respective translational abutments 62, 71 and 72, 79. When the movable equipment 5 is displaced from the open position to the closed position, the shield device 50 folds up into the retracted position, as shown in FIGS. 4, 8, 10. During its translation, the movable equipment 5 displaces the movable segment 53 with it which slides on the intermediate segment 52 until it comes into contact with the translational abutment 72 of the intermediate segment 52. Next, the movable segment 53 pushes the intermediate segment 52 which slides on the fixed segment 51 until it comes into contact with the transverse wall 23 of the housing 2. The movable equipment 5 is then in the closed position, and the shield device 50 in the retracted position. Conversely, when the movable equipment 5 is displaced from the closed position to the open position, it drives the movable segment 53 with it which slides on the intermediate segment 52 until it catches on the translational abutment 72 of the intermediate segment 52. Next, the movable segment 53 pulls the intermediate segment 52 which slides on the fixed segment 51 until it catches on the translational abutment 62 of the fixed segment 51. The movable equipment 5 is then in the open position, and the shield device 50 in the extended position.

Clearly, the architecture of the shield device 50 as described with reference to FIGS. 3 to 10, as well as its translational guide means, its translational abutments, its centring means, etc., is not limiting; any other technically equivalent embodiment may be suitable.

Figure 11:
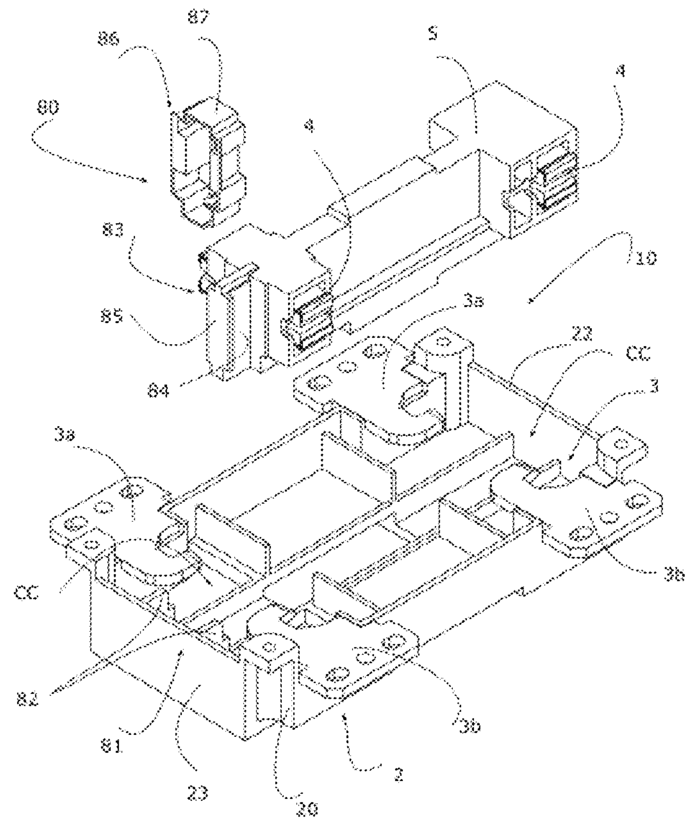
FIG. 11 is an exploded view of a shut-off module and of a shield device in accordance with a first variation of the invention.
Figure 12:
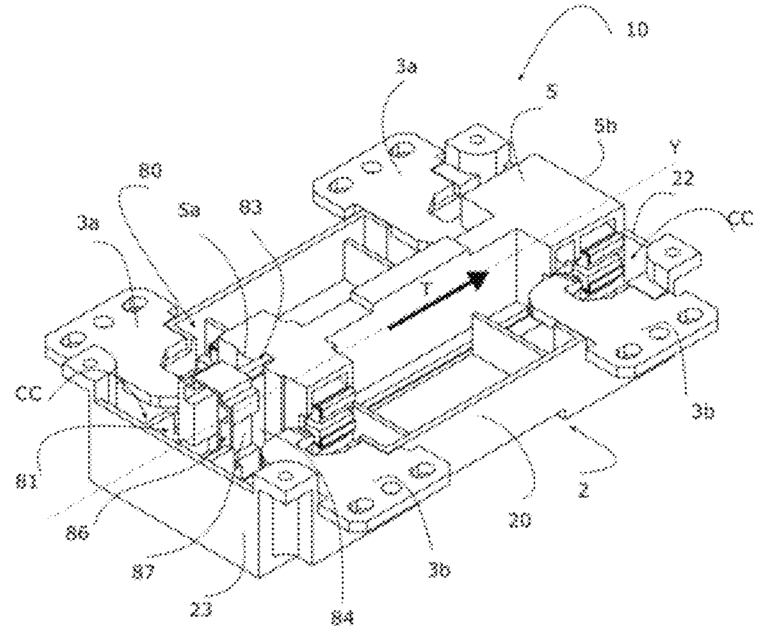
FIG. 12 is a perspective view of the shut-off module of FIG. 11 and of the shield device, in the open position.

In order to illustrate the possible alternative embodiments, FIGS. 11 and 12 show another shield device 80 of telescopic construction constituted by three segments, including:

- a fixed segment 81 constituted by two parallel side walls 82, projecting axially from the transverse wall 23 of the housing 2, forming an integral or non-integral part of the housing,
- a movable segment 83 constituted by a median wall 84, projecting axially from the movable equipment 5, forming an integral or non-integral part of the movable equipment, and terminated by a translational abutment 85, and
- an intermediate segment 86 sliding freely in the fixed segment 81 and on the movable segment 83.

As in the preceding example, the intermediate segment 86 consists of an annular part comprising a peripheral wall 87 which extends along the longitudinal axis Y of the housing 2. The peripheral wall 87 has a polygonal section which is complementary to that of the housing 2, the fixed segment 81 and the movable segment 83, in order to provide mutual guidance in translation and centring of the parts, guaranteeing an operating clearance allowing them to slide. In the same way, the segments 81, 83, 86 comprise translational abutments 85 allowing the shield device 80 to move from a retracted position, in which the segments 81, 83, 86 are superposed when the movable equipment 5 is in the closed position, to an extended position in which the segments 81, 83, 86 are end-to-end when the movable equipment 5 is in the open position (FIG. 12), and vice versa. In this variation, the movable segment 83 slides in the intermediate segment 86, and the intermediate segment 86 slides in the fixed segment 81. The intermediate segment 86 may also cooperate with translational abutments provided in the housing 2 in order to define its extended position.

Figure 13:
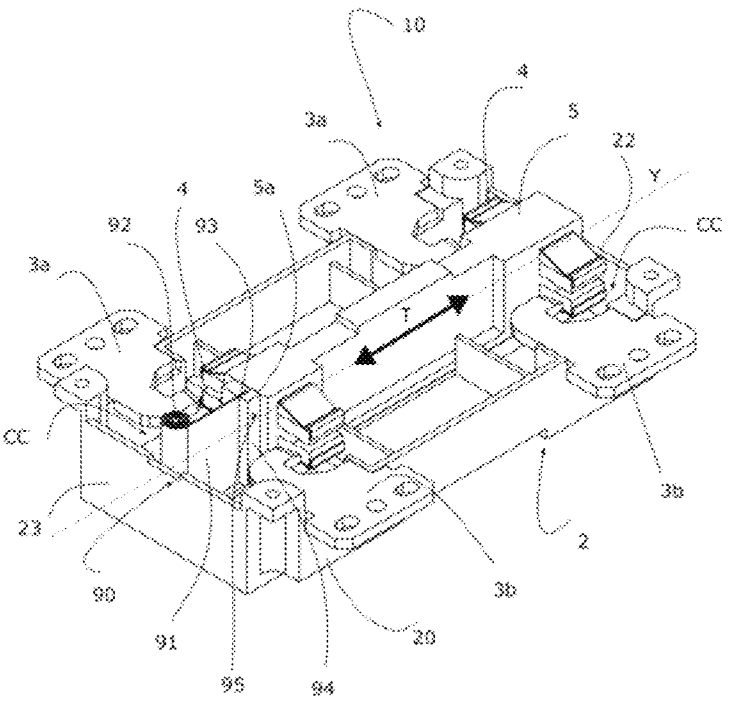
FIG. 13 is a perspective view of a shut-off module and of a shield device in accordance with a second variation of the invention.
Figure 14:
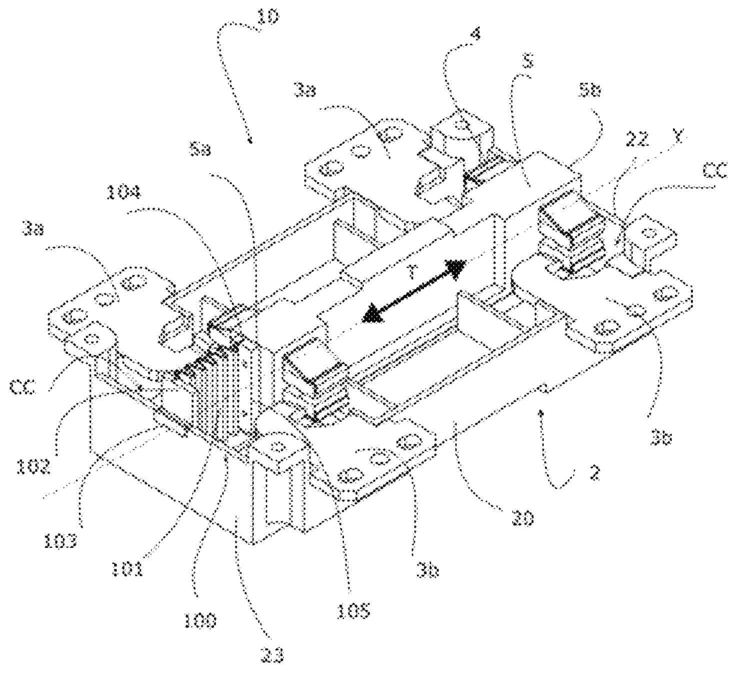
FIG. 14 is a view similar to that of FIG. 13 of a shut-off module and of a shield device in accordance with a third variation of the invention.

By way of non-limiting examples, FIGS. 13 and 14 also illustrate other alternative embodiments of the shield device 90, 100 in accordance with the invention, which make it possible to fulfil the same function as those described above in order to achieve the same result consisting of the production of a dielectric barrier between the upstream fixed contact 3*a* and the downstream fixed contact 3*b* in the shut-off chamber CC, irrespectively of the axial position of the movable equipment 5.

In FIG. 13, the shield device 90 is capable of being wound. It comprises a flexible membrane 91 so that it can be wound about a rotational axle 92 secured to the housing 2. The rotational axle 92 extends vertically, in the vicinity of the transverse wall 23 of the housing, between the lower half-housing 20 and the upper half-housing (not shown). The rotational axle 92 is mounted in the housing so as to be free to rotate about itself or comprises a double axle, a first axle of which is fastened to the housing and a second axle of which is movable in rotation about the first axle. The shield device 90 comprises a fixed end, corresponding to the inner end of the membrane 91 fastened to the rotational axle 92, and a movable end 93, corresponding to the outer end of the membrane 91 fastened to the movable equipment 5 by any compatible fastening means. The movable end 93 of the membrane 91 may be clamped and bonded between two jaws 94 fastened together by screws 95 or the like, the jaws 94 being secured to the corresponding left hand end 5*a* of the movable equipment 5. The shield device 90 further comprises a spring member (not shown), ensuring that the membrane 91 can wind about its rotational axle 92. Thus, the membrane 91 unwinds under the effect of traction exerted by the movable equipment 5 when it is displaced into the open position (FIG. 13) and winds up automatically under the effect of its return member when the traction ceases and the movable equipment 5 is displaced into the closed position.

In FIG. 14, the shield device 100 is extensible. It comprises an accordion-pleated membrane 101, forming a deformable bellows, between a fixed end 102 secured to the transverse wall 23 of the casing 2 by a fixing tab 103 fitted into the notch 57 of the casing, and a movable end 104 secured to the movable equipment 5 by any compatible fastening means, such as between two jaws 105 secured to the left hand end 5*a* of the movable equipment 5. Thus, the membrane 101 unfolds or extends under the effect of a traction exerted by the movable equipment 5 when it is displaced into the open position (FIG. 14) and automatically folds or contracts under the effect of its elasticity when the traction ceases and the movable equipment 5 is displaced into the closed position.

The present invention is clearly not limited to the exemplary embodiments described, but encompasses any modifications and variations within the scope of the accompanying claims which are obvious to a person skilled in the art. Furthermore, the technical features of the various embodiments and variations mentioned above may be combined in their entirety or only in part.

The invention claimed is:

1. An electrical shut-off module comprising an electrically insulating housing, at least one pair of fixed contacts, including an upstream fixed contact and a downstream fixed contact, and at least one movable contact secured to movable equipment which is movable in translation in said housing with respect to said at least one pair of fixed contacts between an open position and a closed position, wherein the shut-off module comprises an electrically insulating shield device disposed in said housing between the upstream fixed contact and the downstream fixed contact of said at least one pair of fixed contacts, said shield device comprising a fixed end secured to said housing and a movable end secured to said movable equipment and having a length that is variable between an extended position when said movable equipment is in the open position and a retracted position when said movable equipment is in the closed position in order to produce a dielectric barrier between the upstream fixed contact and the downstream fixed contact of said at least one pair of fixed contacts.

2. The electrical shut-off module as claimed in claim 1, wherein said shield device is of telescopic construction.

3. The electrical shut-off module as claimed in claim 2, wherein said shield device comprises at least two segments, including a fixed segment secured to said housing and a movable segment secured to said movable equipment.

4. The electrical shut-off module as claimed in claim 3, wherein said shield device further comprises at least one intermediate segment which slides with respect to the fixed segment and to the movable segment.

5. The electrical shut-off module as claimed in claim 4, wherein said shield device and said housing respectively have complementary guide forms disposed to guide at least one of said movable segment and said intermediate segment in sliding translation with respect to said housing.

6. The electrical shut-off module as claimed in claim 3, wherein said shield device comprises translational abutments disposed in order to define said extended position, and respectively provided between the at least two segments.

7. The electrical shut-off module as claimed in claim 1, wherein said shield device is capable of being wound, and comprises at least one membrane wound around a rotational axle secured to the housing, the membrane comprising a fixed end secured to the housing and a movable end secured to the movable equipment.

8. The electrical shut-off module as claimed in claim 1, wherein said shield device is extensible and comprises at least one pleated membrane, the membrane comprising a fixed end secured to the housing and a movable end secured to the movable equipment.

* * * * *